(12) United States Patent
Makino

(10) Patent No.: US 12,545,130 B2
(45) Date of Patent: Feb. 10, 2026

(54) MANAGEMENT SYSTEM

(71) Applicant: SUBARU CORPORATION, Tokyo (JP)

(72) Inventor: Kazuki Makino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 700 days.

(21) Appl. No.: 18/067,209

(22) Filed: Dec. 16, 2022

(65) Prior Publication Data

US 2023/0214946 A1 Jul. 6, 2023

(30) Foreign Application Priority Data

Dec. 27, 2021 (JP) ................................. 2021-212630

(51) Int. Cl.
| | |
|---|---|
| *B60L 53/12* | (2019.01) |
| *B60L 53/126* | (2019.01) |
| *B60L 53/63* | (2019.01) |
| *B60L 53/67* | (2019.01) |
| *G06Q 10/02* | (2012.01) |
| *G06Q 10/0631* | (2023.01) |
| *G06Q 50/06* | (2012.01) |
| *G08G 1/01* | (2006.01) |

(52) U.S. Cl.
CPC ............ *B60L 53/12* (2019.02); *B60L 53/126* (2019.02); *B60L 53/63* (2019.02); *B60L 53/67* (2019.02); *G06Q 10/02* (2013.01); *G06Q 10/06316* (2013.01); *G06Q 50/06* (2013.01); *B60L 2240/12* (2013.01); *G08G 1/0145* (2013.01)

(58) Field of Classification Search
CPC ...................................................... B60L 53/12
USPC .......................................................... 320/108
See application file for complete search history.

(56) References Cited

U.S. PATENT DOCUMENTS

| | | | |
|---|---|---|---|
| 7,164,211 B1 * | 1/2007 | Tafoya ................... | H02K 35/06 |
| | | | 290/1 R |
| 10,131,238 B2 * | 11/2018 | Ricci ...................... | B60L 53/39 |
| 10,336,194 B2 * | 7/2019 | Ricci ...................... | B60L 53/38 |

(Continued)

FOREIGN PATENT DOCUMENTS

| | | |
|---|---|---|
| JP | 2013-038991 A | 2/2013 |
| JP | 2018-005949 A | 1/2018 |

(Continued)

*Primary Examiner* — Jerry D Robbins
(74) *Attorney, Agent, or Firm* — Smith, Gambrell & Russell, LLP

(57) ABSTRACT

A management system used in a charging facility for performing non-contact charge to electric vehicles running in a charge zone includes a control apparatus including a processor and a memory and configured to select one or more charge permitted vehicles for which charge is permitted from an electric vehicle group including electric vehicles running in a determination area including at least part of the charge zone. The control apparatus is configured to calculate an upper-limit number of the charge permitted vehicles based on a target vehicle speed indicated to the charge permitted vehicles, to order the electric vehicles in the electric vehicle group in an ascending order of mileages based on the mileage of each electric vehicle composing the electric vehicle group, and to select the charge permitted vehicle from the electric vehicle group based on a result of ordering the electric vehicles and the upper-limit number.

12 Claims, 12 Drawing Sheets

(56) References Cited

U.S. PATENT DOCUMENTS

| | | | |
|---|---|---|---|
| 11,524,600 B2* | 12/2022 | Treadway | B60L 53/62 |
| 11,538,120 B2* | 12/2022 | Lee | H02J 50/15 |
| 12,221,003 B1* | 2/2025 | Sylvester | B60L 53/66 |
| 2009/0045773 A1* | 2/2009 | Pandya | H02J 50/90 |
| | | | 320/108 |
| 2017/0028854 A1* | 2/2017 | Lee | H02J 7/00 |
| 2018/0181095 A1* | 6/2018 | Funk | G05B 19/042 |
| 2019/0039463 A1* | 2/2019 | Moghe | B60L 53/12 |
| 2019/0039470 A1* | 2/2019 | Moghe | B60L 53/00 |
| 2019/0039471 A1* | 2/2019 | Moghe | B60L 53/38 |
| 2019/0381891 A1* | 12/2019 | Moghe | G06N 20/00 |
| 2021/0023953 A1* | 1/2021 | Ohta | B60L 5/005 |
| 2021/0291695 A1* | 9/2021 | Obaidi | B60L 53/665 |
| 2022/0255348 A1* | 8/2022 | Afridi | H02J 50/05 |
| 2022/0363147 A1* | 11/2022 | Hashimoto | B60L 53/122 |
| 2022/0363148 A1* | 11/2022 | Hashimoto | B60L 53/126 |
| 2023/0021364 A1* | 1/2023 | Hirano | B60L 53/12 |
| 2023/0032752 A1* | 2/2023 | Yokoyama | B60L 53/12 |
| 2023/0051148 A1* | 2/2023 | Appelbaum | B60L 53/63 |
| 2023/0082220 A1* | 3/2023 | Ishihara | B60L 53/66 |
| | | | 320/108 |
| 2023/0122088 A1* | 4/2023 | McCool | H02J 50/40 |
| | | | 320/108 |
| 2023/0202324 A1* | 6/2023 | Lee | H02J 50/12 |
| | | | 320/109 |
| 2023/0226937 A1* | 7/2023 | Hanson | B60L 53/36 |
| | | | 30/108 |
| 2023/0339346 A1* | 10/2023 | Miler | B60L 53/62 |
| 2024/0198834 A1* | 6/2024 | Bandi | H02J 50/10 |

FOREIGN PATENT DOCUMENTS

| | | |
|---|---|---|
| JP | 2018-092398 A | 6/2018 |
| JP | 2021-022957 A | 2/2021 |

* cited by examiner

| VEHICLE ORDER | VEHICLE ID | MILEAGE (Xa) [km] | TARGET CHARGE POWER (Xb) [kwh] | CATEGORY |
|---|---|---|---|---|
| 1 | ev08 | 1 | 70 | C1 |
| 2 | ev10 | 3 | 80 | C2 |
| 3 | ev07 | 5 | 50 | C2 |
| 4 | ev01 | 10 | 40 | C3 |
| 5 | ev03 | 15 | 80 | C3 |
| 6 | ev05 | 45 | 65 | C4 |
| 7 | ev09 | 50 | 60 | C4 |
| 8 | ev02 | 40 | 50 | C4 |
| 9 | ev04 | 200 | 40 | C4 |
| 10 | ev06 | 150 | 30 | C4 |

CHARGE ZONE L1a ··· 2 [km]
CHARGE ZONE L1b ··· 2 [km]
CHARGE ZONE L1c ··· 2 [km]
NON-CHARGE ZONE Sn ··· 30 [km]
UPPER-LIMIT NUMBER Nm ··· SIX

| | CHARGE ZONE: L1a (DETERMINATION AREA: A1a) | | | |
|---|---|---|---|---|
| VEHICLE ORDER | VEHICLE ID | MILEAGE (Xa) [km] | TARGET CHARGE POWER (Xb) [kwh] | CATEGORY |
| 1 | ev08 | 3 | 68 | C2 |
| 2 | ev10 | 5 | 78 | C2 |
| 3 | ev07 | 7 | 48 | C3 |
| 4 | ev12 | 10 | 40 | C3 |
| 5 | ev13 | 15 | 50 | C3 |
| 6 | ev14 | 20 | 55 | C3 |
| 7 | ev05 | 47 | 63 | C4 |
| 8 | ev09 | 49 | 61 | C4 |
| 9 | ev11 | 40 | 50 | C4 |
| 10 | ev04 | 199 | 41 | C4 |
| 11 | ev06 | 149 | 31 | C4 |

CHARGE ZONE L1a … 2 [km]
CHARGE ZONE L1b … 2 [km]
CHARGE ZONE L1c … 2 [km]
NON-CHARGE ZONE Sn … 30 [km]
UPPER-LIMIT NUMBER Nm … SIX

MANAGEMENT SYSTEM

CROSS-REFERENCE TO RELATED APPLICATIONS

The present application claims priority from Japanese Patent Application No. 2021-212630 filed on Dec. 27, 2021, the entire contents of which are hereby incorporated by reference.

BACKGROUND

The disclosure relates to a management system used in a charging facility for electric vehicles.

Charging facilities that charge batteries mounted on electric vehicles, such as electric automobiles and hybrid vehicles, in a non-contact manner have been developed in recent years. Charging facilities that use a charging lane having an embedded power transmitting coil to supply power from the charging lane to an electric vehicle that is running have been developed as the charging facilities in the non-contact manner (refer to Japanese Unexamined Patent Application Publication (JP-A) No. 2018-5949, JP-A No. 2013-38991, JP-A No. 2021-22957, and JP-A No. 2018-92398).

SUMMARY

An aspect of the disclosure provides a management system used for a charging facility configured to perform non-contact charge to multiple electric vehicles running in a charge zone. The management system includes a control apparatus. The control apparatus includes a processor and a memory that are communicably coupled to each other. The control apparatus is configured to select one or more charge permitted vehicles, for which charge is permitted, from an electric vehicle group including electric vehicles running in a determination area including at least part of the charge zone. The control apparatus is configured to calculate an upper-limit number of the one or more charge permitted vehicles based on a target vehicle speed indicated to the one or more charge permitted vehicles, to order the electric vehicles in the electric vehicle group in an ascending order of mileages based on the mileage of each electric vehicle composing the electric vehicle group, and to select the one or more charge permitted vehicle from the electric vehicle group based on a result of ordering the electric vehicles in the electric vehicle group and the upper-limit number.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Since the length of a charging lane and power supply capacity are limited in a charging facility that charges electric vehicles that are running, it is difficult to charge all the electric vehicles to be subjected to non-contact charge. Accordingly, the electric vehicles for which charge is permitted are to be appropriately selected from the multiple electric vehicles to be subjected to the non-contact charge.

It is desirable to appropriately select electric vehicles for which charge is permitted.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

[Charging Facility]

Figure 1:
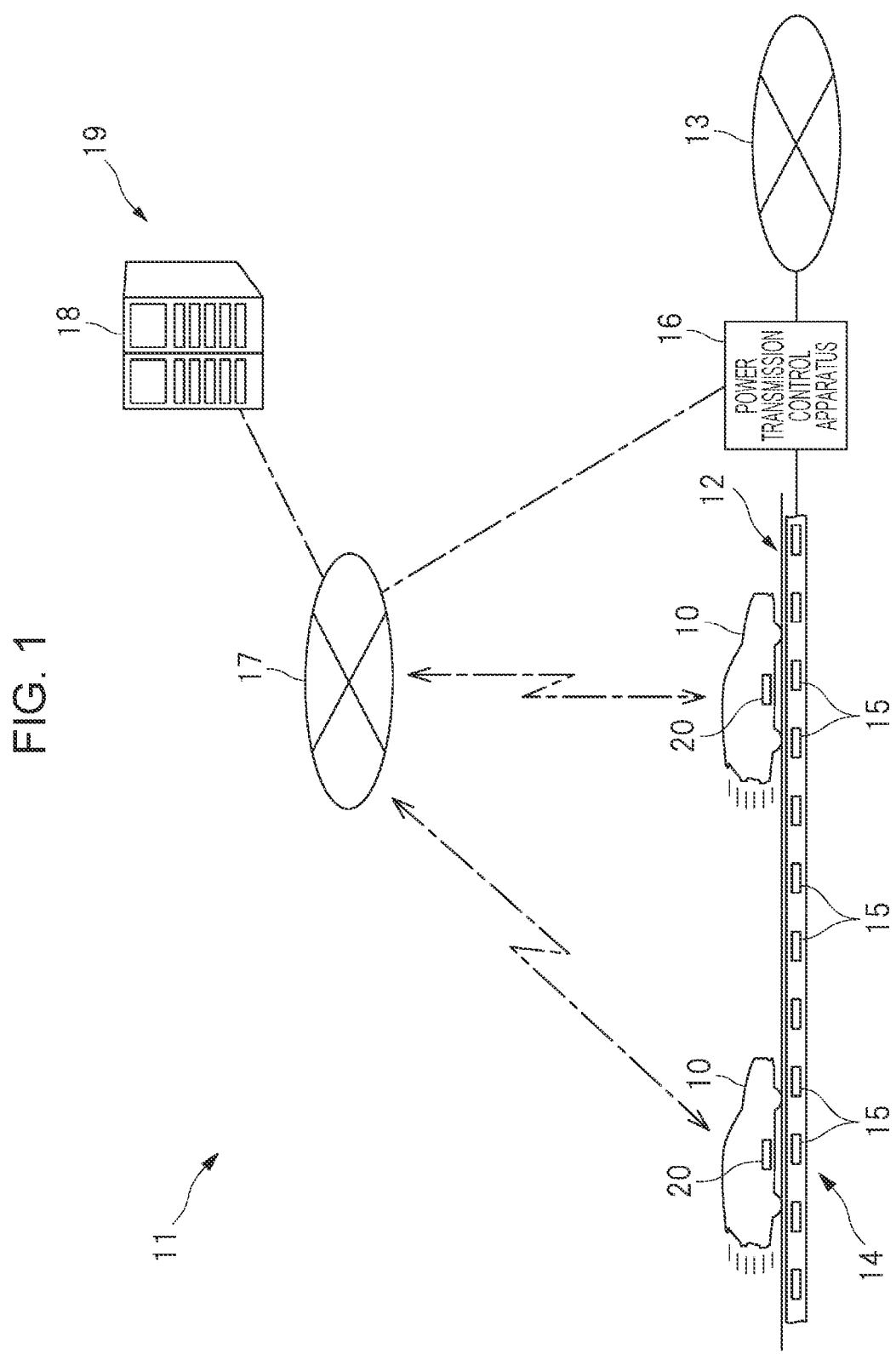
FIG. 1 illustrates an example of a charging facility that performs non-contact charge to electric vehicles.

FIG. 1 illustrates an example of a charging facility 11 that performs the non-contact charge to electric vehicles 10. As illustrated in FIG. 1, the charging facility 11 includes a power transmitting coil group 14 that is embedded in a charging lane 12 and that is connected to a power system 13 and a power transmission control apparatus 16 that controls an energization state of each power transmitting coil 15 composing the power transmitting coil group 14. The charging facility 11 also includes a management system 19 composed of a central server 18 connected to the power transmission control apparatus 16 via a communication network 17. In one embodiment, the central server 18 may serve as a "control apparatus". As described below, when the electric vehicle 10 including a power receiving coil 20 runs on the charging lane 12, an electromagnetic field of each power transmitting coil 15 is controlled in synchronization with the passing of the electric vehicle 10 and power is supplied from the power transmitting coils 15 to the power receiving coil 20 in the non-contact manner. The non-contact charge by the charging facility 11 is also called wireless charge.

Figure 2:
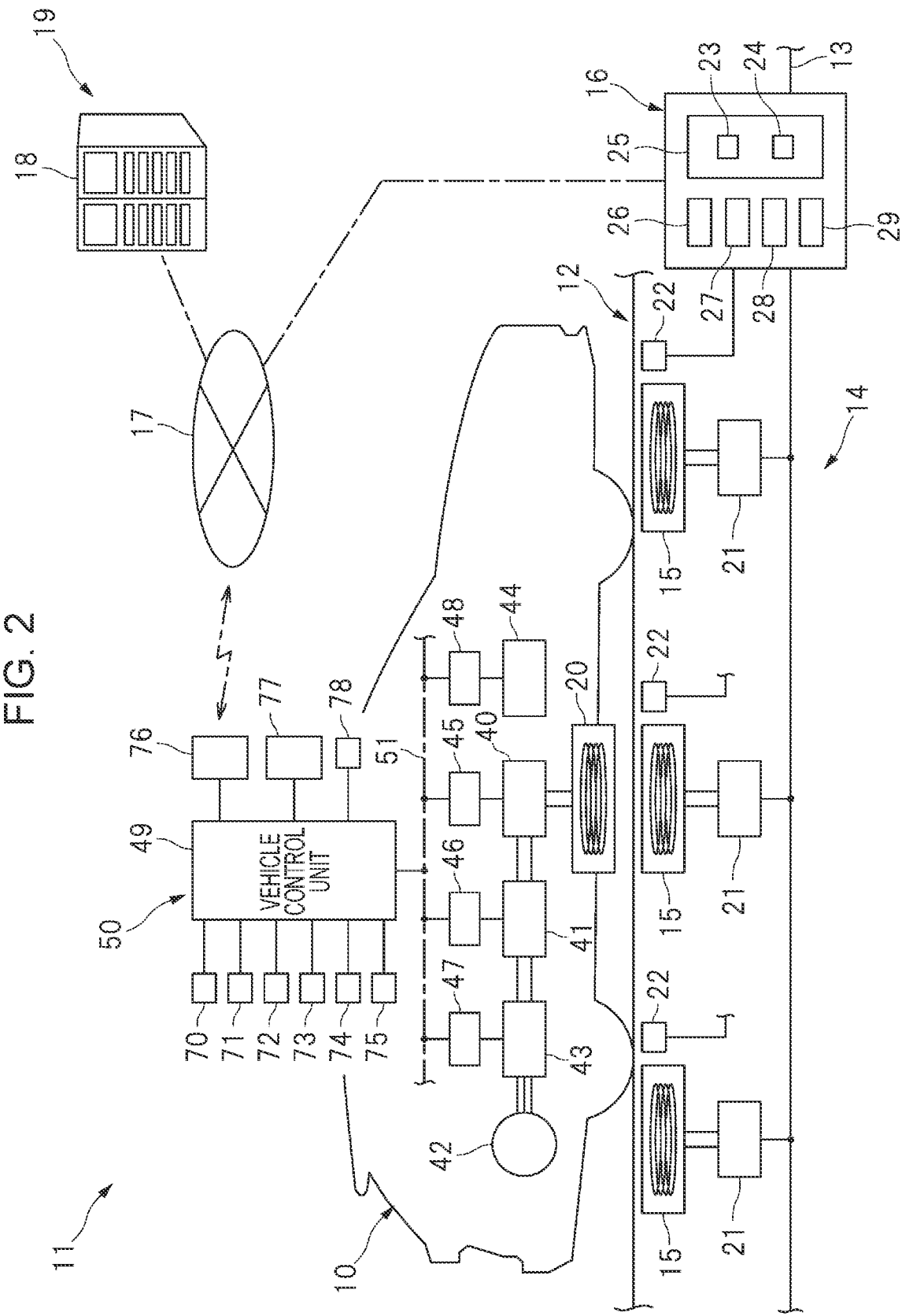
FIG. 2 illustrates an example of a power transmitting coil group, a power transmission control apparatus, and an electric vehicle.

FIG. 2 illustrates an example of the power transmitting coil group 14, the power transmission control apparatus 16, and the electric vehicle 10. As illustrated in FIG. 2, the power transmitting coil group 14 embedded in the charging lane 12 includes the multiple power transmitting coils 15 disposed at a predetermined interval, multiple high-frequency power supplies 21 connected to the corresponding power transmitting coils 15, and multiple position sensors 22 that detect the driving position of the electric vehicle 10. The power transmission control apparatus 16 includes a control unit 25 including a processor 23, a main memory 24, and so on. A certain program is stored in the main memory 24 and the program is executed by the processor 23. The processor 23 is connected to the main memory 24 so as to be capable of communication. In addition, the power transmission control apparatus 16 includes a storage unit 26 composed of a non-volatile memory or the like, a communication unit 27 connected to the communication network 17, a power supply drive unit 28 that generates a driving signal for the high-frequency power supplies 21, and a power monitoring unit 29 that monitors power supply from the power system 13. Programs, a variety of data, and so on are stored in the storage unit 26 composed of a non-volatile memory or the like. Multiple processors 23 may be incorporated in the control unit 25 and multiple main memories 24 may be incorporated in the control unit 25.

Figure 3:
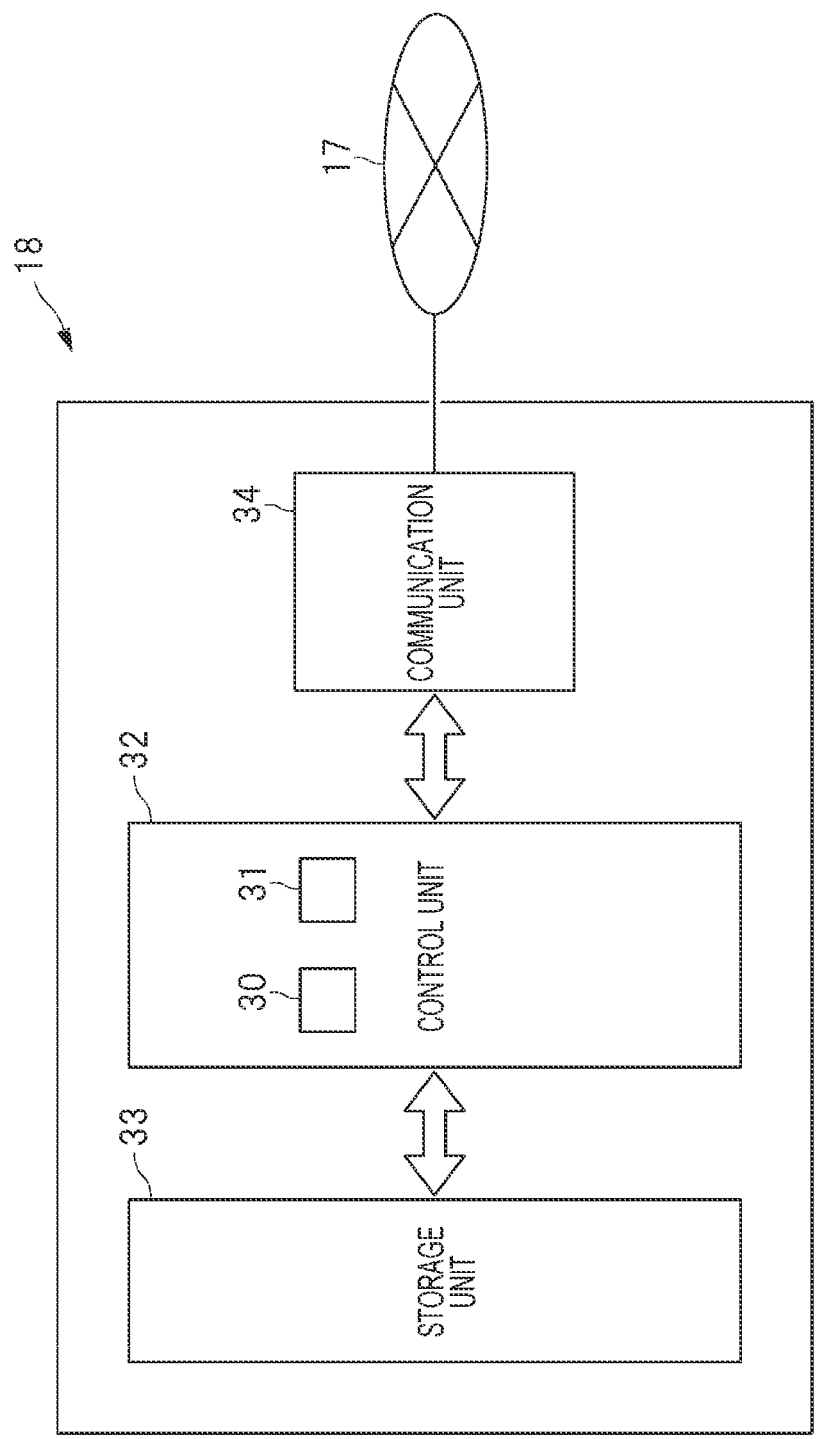
FIG. 3 illustrates an example of the basic structure of a central server.

FIG. 3 illustrates an example of the basic structure of the central server 18. As illustrated in FIG. 3, the central server 18 includes a control unit 32 including a processor 30, a main memory (memory) 31, and so on. A certain program is stored in the main memory 31 and the program is executed by the processor 30. The processor 30 is connected to the main memory 31 so as to be capable of communication. The central server 18 includes a storage unit 33 composed of a non-volatile memory or the like and a communication unit 34 connected to the communication network 17. Programs, a variety of data, and so on are stored in the storage unit 33 composed of a non-volatile memory or the like. Multiple processors 30 may be incorporated in the control unit 32 and multiple main memories 31 may be incorporated in the control unit 32.

In charge of a battery 41 in the electric vehicle 10 by the charging facility 11, high-frequency power is supplied to each power transmitting coil 15 in synchronization with the passing of the electric vehicle 10. The power transmission control apparatus 16 in the charging facility 11 controls the high-frequency power supplies 21 in synchronization with the passing of the electric vehicle 10 based on a control signal transmitted from the central server 18 to supply the high-frequency power from the high-frequency power supplies 21 to the corresponding power transmitting coils 15. Upon supply of the high-frequency power to the power transmitting coils 15, the electromagnetic fields at the power transmitting coils 15 and near the power transmitting coils 15 are varied and the variation in the electromagnetic fields is transmitted to the power receiving coil 20 through resonance phenomenon. The power is capable of being supplied from the power transmitting coils 15 on the charging lane 12 to the power receiving coil 20 in the electric vehicle 10 to perform the non-contact charge to the electric vehicle 10 that is running on the charging lane 12.

[Electric Vehicle]

As illustrated in FIG. 2, the electric vehicle 10, such as an electric automobile, includes the power receiving coil 20 mounted on the bottom of the vehicle body, an in-vehicle charger 40 connected to the power receiving coil 20, and the battery 41 connected to the in-vehicle charger 40. The electric vehicle 10 also includes a drive motor 42 coupled to wheels, an inverter 43 that controls the energization state of the drive motor 42, and a steering motor 44 that drives a lack bar and so on of a steering mechanism. An electronic control unit for controlling each device, such as the in-vehicle charger 40, mounted in the electric vehicle 10 is connected to the device. In other words, a charge control unit 45 is connected to the in-vehicle charger 40 and a battery control unit 46 is connected to the battery 41. A motor control unit 47 is connected to the inverter 43 and a steering control unit 48 is connected to the steering motor 44.

A control system 50 composed of multiple electronic control units is provided in the electric vehicle 10 in order to control the in-vehicle charger 40, the drive motor 42, and so on in the above manner. The electronic control units composing the control system 50 include the charge control unit 45, the battery control unit 46, the motor control unit 47, and the steering control unit 48 described above. In addition, the electronic control units composing the control system 50 include a vehicle control unit 49 that supplies the control signal to each of the control units 45 to 48. The control units 45 to 49 are connected to each other via an in-vehicle network 51, such as a controller area network (CAN), so as to be capable of communication.

Figure 4:
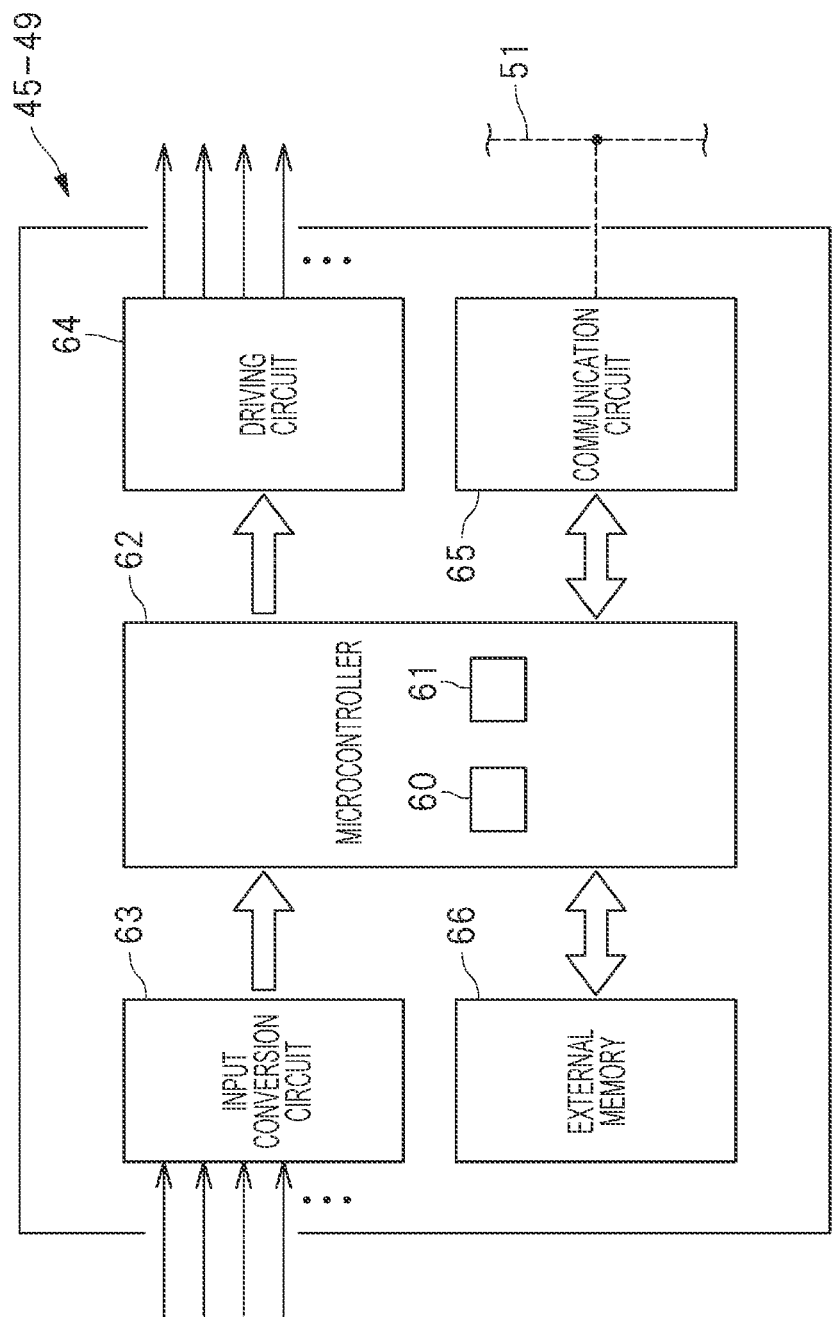
FIG. 4 illustrates an example of the basic structure of each control unit.

FIG. 4 illustrates an example of the basic structure of each of the control units 45 to 49. As illustrated in FIG. 4, each of the control units 45 to 49 includes a microcontroller 62 incorporating a processor 60, a main memory 61, and so on. A certain program is stored in the main memory 61 and the program is executed by the processor 60. The processor 60 is connected to the main memory 61 so as to be capable of communication. Multiple processors 60 may be incorporated in the microcontroller 62 and multiple main memories 61 may be incorporated in the microcontroller 62.

Each of the control units 45 to 49 includes an input conversion circuit 63, a driving circuit 64, a communication circuit 65, an external memory 66, and so on. The input conversion circuit 63 converts signals supplied from various sensors into signals which the microcontroller 62 is capable of receiving. The driving circuit 64 generates driving signals to the various devices including the in-vehicle charger 40 described above based on a signal output from the microcontroller 62. The communication circuit 65 converts the signal output from the microcontroller 62 into a communication signal for another control unit. In addition, the communication circuit 65 converts the communication signal received from another control unit into the signal which the microcontroller 62 is capable of receiving. Programs, a variety of data, and so on are stored in the external memory 66 composed of a non-volatile memory or the like.

The vehicle control unit 49 sets operating goals of the in-vehicle charger 40, the drive motor 42, and so on based on input information from the various control units 45 to 48 and the various sensors described below. Then, the vehicle control unit 49 generates the control signals corresponding to the operating goals of the in-vehicle charger 40, the drive motor 42, and so on, and supplies the control signals to the various control units. The sensors connected to the vehicle control unit 49 include a vehicle speed sensor 70 that detects a vehicle speed, which is the driving speed of the electric vehicle 10, an acceleration sensor 71 that detects a manipulated variable of an accelerator pedal, and a brake sensor 72 that detects the manipulated variable of a brake pedal. The sensors connected to the vehicle control unit 49 include a radar unit 73 that detects an obstacle or the like around the vehicle and a camera unit 74 that captures an image around the vehicle. In addition, a global positioning system (GPS) receiver 75 that receives a signal from a GPS satellite and a communication unit 76 connected the communication network 17 are connected to the vehicle control unit 49. Furthermore, a setting device 77 operated by a driver who drives the electric vehicle 10 in setting of conditions of the non-contact charge described below and a Start switch 78 operated by the driver at startup of the control system 50 are connected to the vehicle control unit 49.

[Charging Lane]

Figure 5:
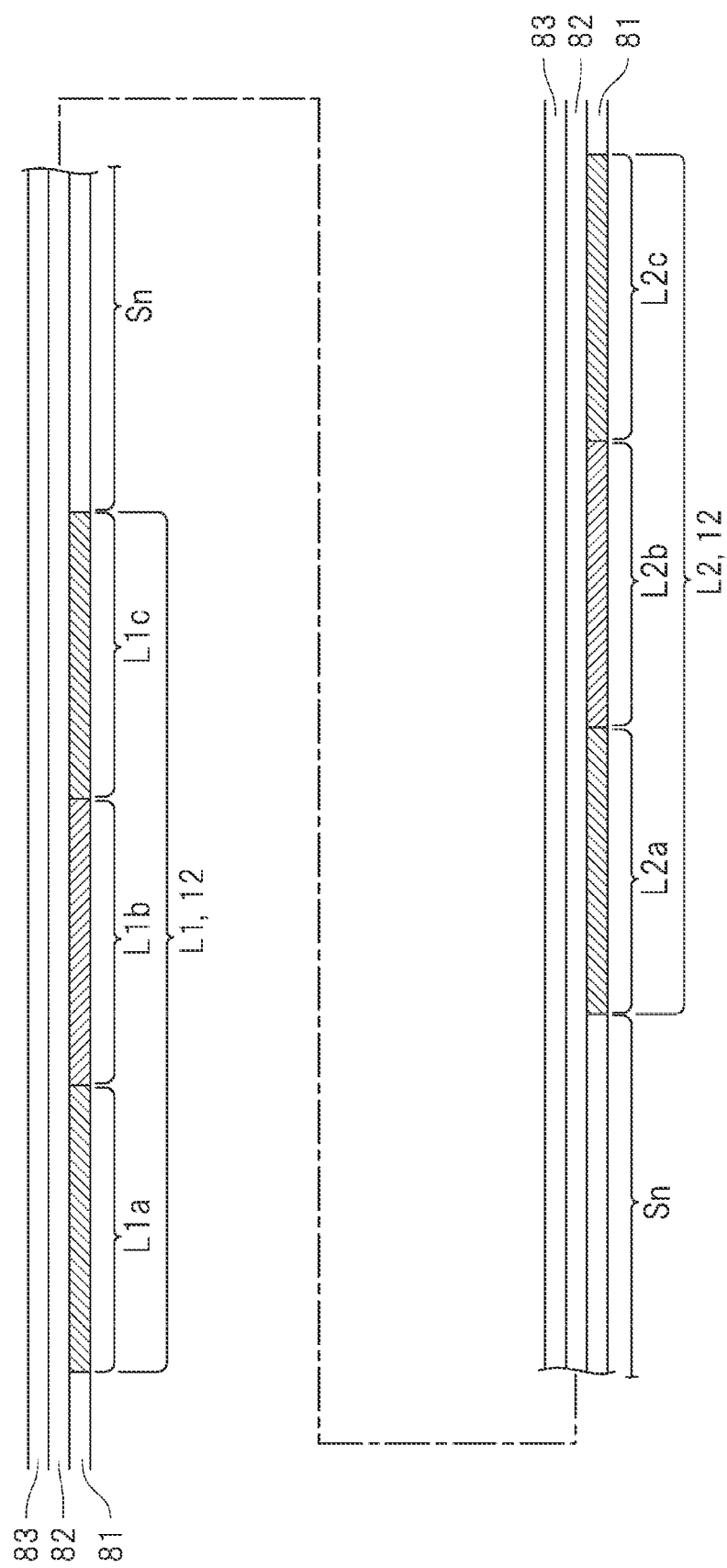
FIG. 5 illustrates an example of charging lanes composing the charging facility.
Figure 6:
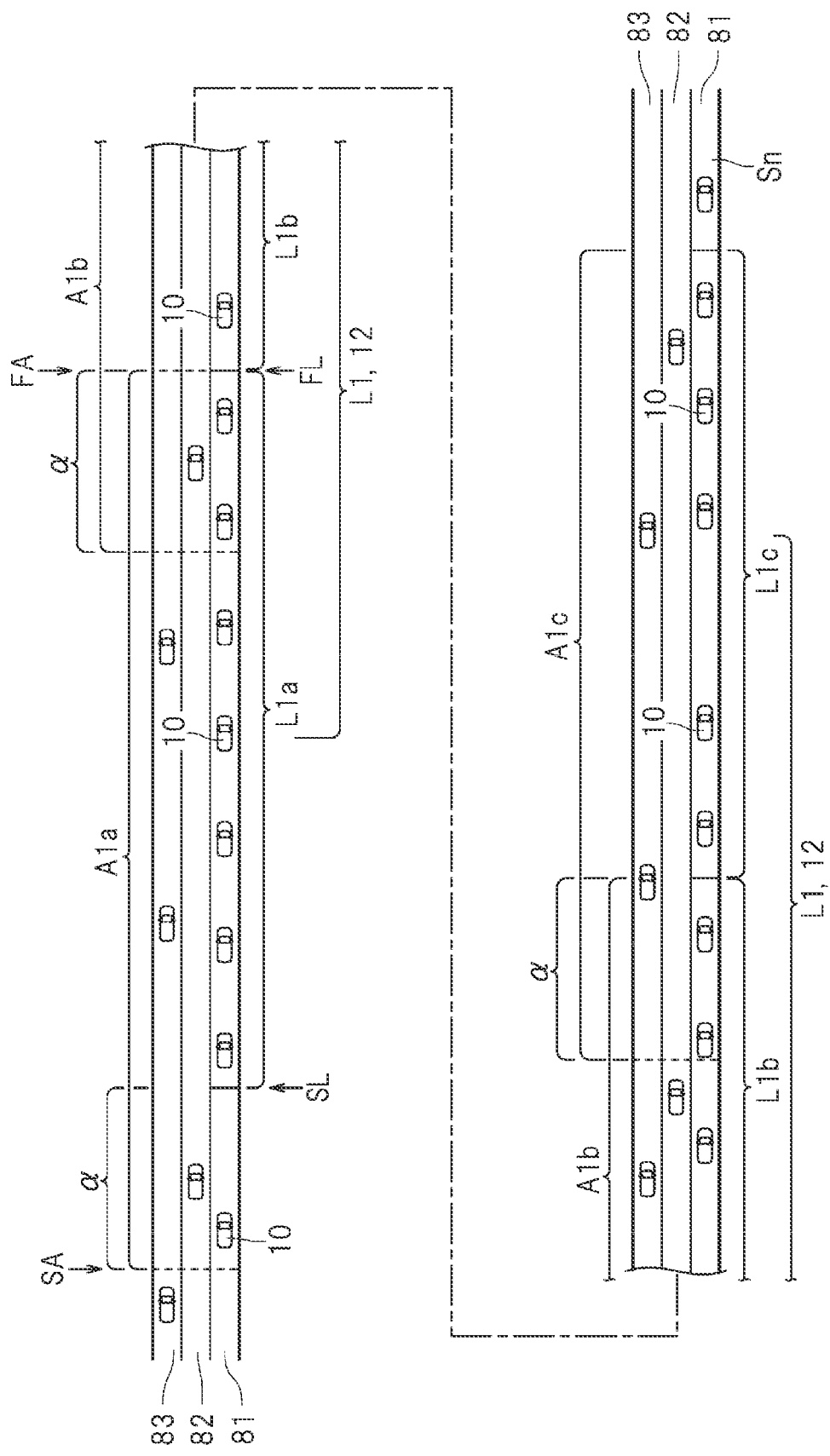
FIG. 6 is an enlarged view of the charging lane illustrated in FIG. 5.

FIG. 5 illustrates an example of charging lanes L1 and L2 composing the charging facility 11. FIG. 6 is an enlarged view of the charging lane L1 illustrated in FIG. 5. The reference numeral of the charging lane 12 is replaced with the reference numerals and letters L1 and L2 in the following description. As illustrated in FIG. 5, three driving lanes 81, 82, and 83 are set on a limited highway, such as an expressway. As illustrated by hatched areas in FIG. 5, the two charging lanes L1 and L2 in which the power transmitting coil group 14 is embedded over a certain distance are set on the driving lane 81. A non-charge zone Sn in which no power transmitting coil group 14 is embedded is set between the charging lane L1 and the charging lane L2. Furthermore, the charging lane L1 is composed of three charge zones L1$a$, L1$b$, and L1$c$ and the charging lane L2 is composed of three charge zones L2$a$, L2$b$, and L2$c$.

Any number of the charge zones composing the charging lanes L1 and L2 may be set. The charging lane L1 and the charging lane L2 may each be composed of one or two charge zones or may each be composed of four or more charge zones. Although the two charging lanes L1 and L2 are placed in the example illustrated in FIG. 5, the placement of the charging lanes L1 and L2 is not limited to this. For example, one charging lane may be placed or three or more charging lanes may be placed.

As illustrated in FIG. 6, a determination area A1$a$ over the three driving lanes 81, 82, and 83 is set in the charge zone L1$a$ in order to determine the electric vehicle 10 that is a charge permitted target in the charge zone L1$a$ on the charging lane L1. A start point SA of the determination area A1$a$ precedes a start point SL of the charge zone L1$a$ by a predetermined distance a, and an end point FA of the determination area A1$a$ coincides with an end point FL of the charge zone L1$a$.

Although the start point SA of the determination area A1$a$ precedes the start point SL of the charge zone L1$a$ in the example illustrated in FIG. 6, the start point SA and the start point SL are not limited to this. The start point SA of the determination area A1$a$ may coincide with the start point SL of the charge zone L1$a$. Although the end point FA of the determination area A1$a$ coincides with the end point FL of the charge zone L1$a$, the end point FA and the end point FL are not limited to this. The end point FA of the determination area A1$a$ may precede the end point FL of the charge zone L1$a$ by a predetermined distance. In other words, in the setting of the determination area A1$a$, at least part of the charge zone L1$a$ may be included in the determination area A1$a$.

Similarly, a determination area A1$b$ over the three driving lanes 81, 82, and 83 is set in the charge zone L1$b$ in order to determine the electric vehicle 10 to be charged in the charge zone L1$b$ on the charging lane L1. In addition, a determination area A1$c$ over the three driving lanes 81, 82, and 83 is set in the charge zone L1$c$ in order to determine the electric vehicle 10 to be charged in the charge zone L1$c$ on the charging lane L1. Also in these cases, at least part of the charge zone L1$b$ may be included in the determination area A1$b$ and at least part of the charge zone L1$c$ may be included in the determination area A1$c$. Similarly, determination areas are set for the respective charge zones L2$a$, L2$b$, and L2$c$ also on the charging lane L2, as on the charging lane L1. Also for the determination areas corresponding to the respective charge zones L2$a$, L2$b$, and L2$c$, at least part of the charge zones L2$a$, L2$b$, and L2$c$ may be included in the corresponding determination areas.

[Vehicle Control During Charge]

Figure 7:
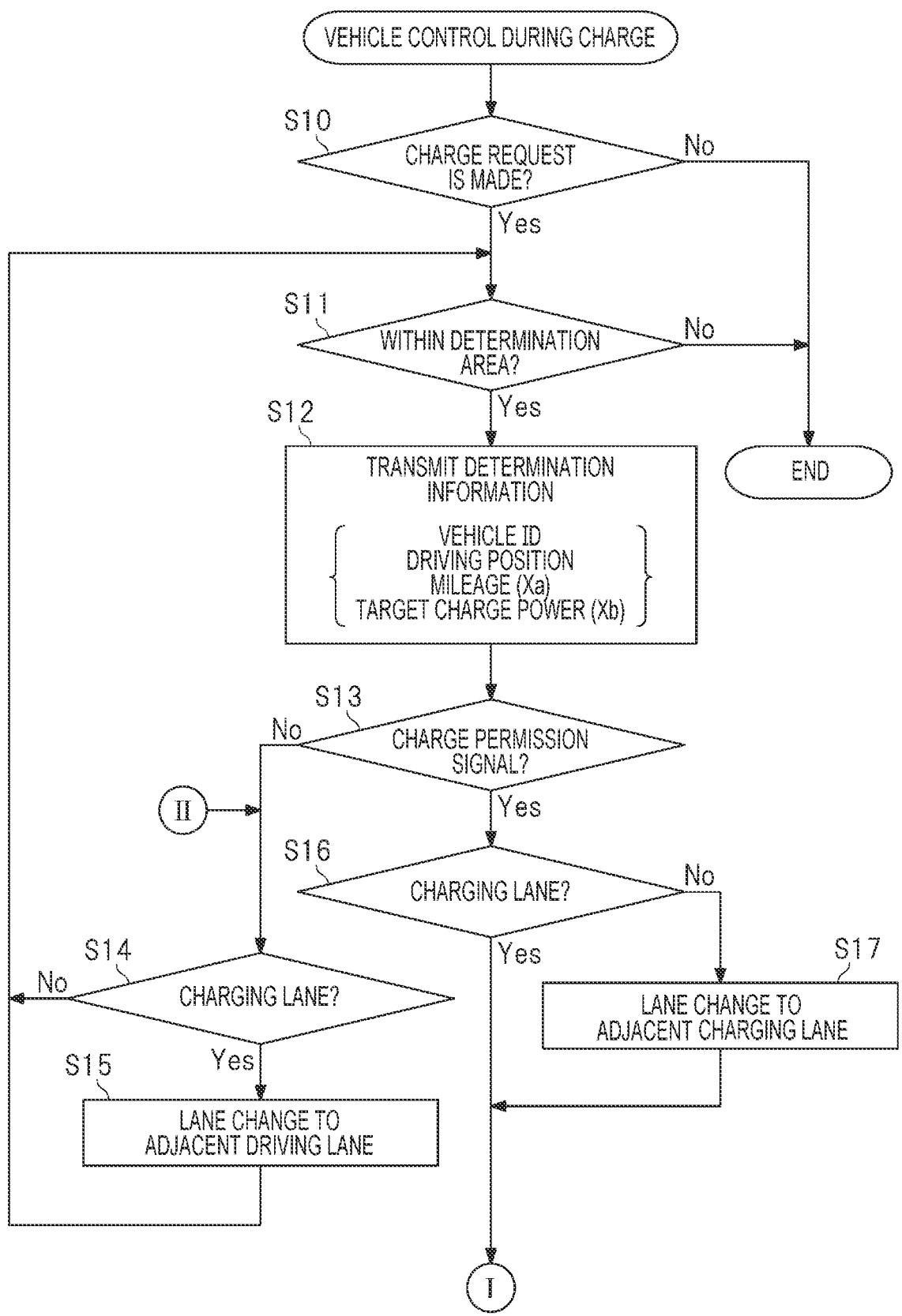
FIG. 7 is a flowchart illustrating an example of a process of vehicle control during charge performed by a control system.
Figure 8:
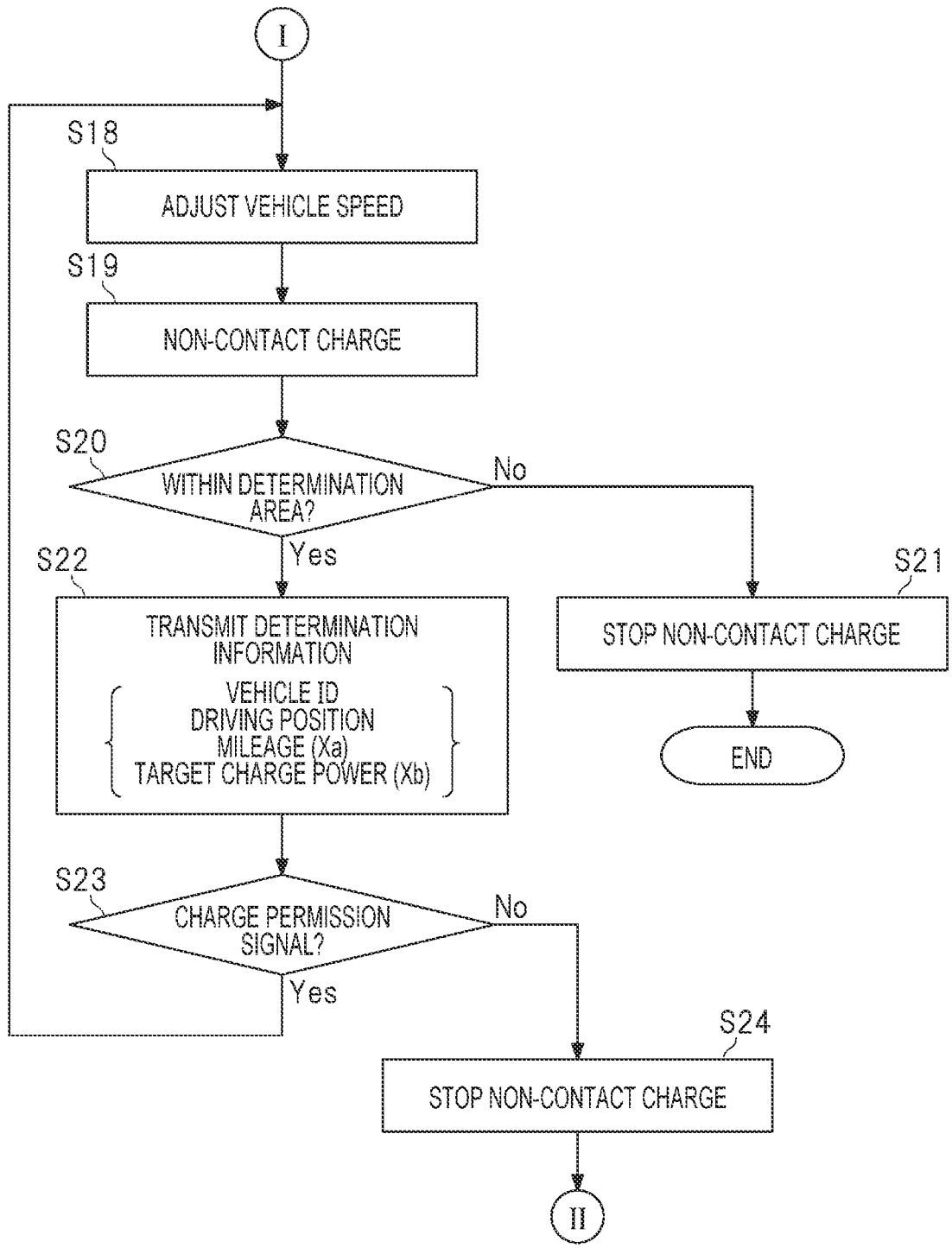
FIG. 8 is a flowchart illustrating the example of the process of the vehicle control during charge performed by the control system.

Vehicle control during charge, which is performed by the control system 50 in the electric vehicle 10, will now be described. FIG. 7 and FIG. 8 are flowcharts illustrating an example of a process of the vehicle control during charge, which is performed by the control system 50. The flowchart illustrated in FIG. 7 is connected with the flowchart illustrated in FIG. 8 at a portion I and a portion II. The respective steps illustrated in the flowcharts in FIG. 7 and FIG. 8 indicate the process performed by the one or more processors 60 composing the control system 50. The vehicle control during charge illustrated in FIG. 7 and FIG. 8 is performed every predetermined period by the control system 50 of each electric vehicle 10 entering each determination area. The process of the vehicle control during charge will now be described, taking the determination area A1$a$ corresponding to the charge zone L1$a$ as an example. The electric vehicle 10 performing the vehicle control during charge is hereinafter referred to as the vehicle 10 to which the vehicle control during charge is applied in the following description with reference to FIG. 7 and FIG. 8.

First, as illustrated in FIG. 2, the setting device 77 operated by the driver is connected to the vehicle control unit 49 in order to set the conditions of the non-contact charge. The various conditions of the non-contact charge set with the setting device 77 include a setting indicating whether a charge request is made, that is, whether the non-contact charge is to be performed, a setting of the charging lane L1 or L2 for which the non-contact charge is to be performed, and a target State of Charge (SOC) of the battery 41 during the non-contact charge. The target SOC of the battery 41 is a target value of the SOC to be increased through the non-contact charge. The SOC of the battery 41 is a ratio indicating the remaining amount of electricity in the battery 41 and a ratio of an amount of accumulated power with respect to a full charge capacity of the battery 41. The SOC of the battery 41 is periodically calculated by the battery control unit 46 based on charge and discharge current of the battery 41, voltage between terminals, and so on. For example, the SOC is calculated as 100% when the battery 41 is charged to an upper limit capacity and the SOC is calculates as 0% when the battery 41 is discharged to a lower limit capacity. In addition, as described below, when the non-contact charge is performed through driving on the charging lane L1 or L2, automatic driving control is performed. In the automatic driving control, the privilege of a driving operation is moved from the driver to the control system 50.

Referring to FIG. 7, in Step S10, the control system 50 determines whether a request concerning the non-contact charge using the charging facility 11 is made. If the control system 50 determines that the charge request is made (YES in Step S10), in Step S11, the control system 50 determines whether the vehicle 10 is running within the determination area A1a. If the control system 50 determines that the vehicle 10 is running within the determination area A1a (YES in Step S11), in Step S12, the control system 50 transmits a variety of determination information from the control system 50 in the vehicle 10 to the central server 18. The determination information to be transmitted to the central server 18 includes a vehicle identifier (ID), which is identification information about the vehicle 10, the driving position of the vehicle 10, a mileage Xa of the vehicle 10, and target charge power Xb of the vehicle 10. The vehicle control unit 49 composing the control system 50 calculates the driving position based on the signal transmitted from the GPS satellite. In addition, the vehicle control unit 49 calculates the mileage Xa at which the vehicle 10 is capable of running using the current amount of accumulated power of the battery 41 based on the SOC of the battery 41 and the last electricity consumption of the vehicle 10. Furthermore, the vehicle control unit 49 calculates the target charge power Xb, which is an amount of charged power which the driver attempts to achieve in the non-contact charge, based on the SOC and the target SOC of the battery 41. In other words, the target charge power Xb is the amount of power calculated by multiplying the difference between the target SOC and the current SOC by the amount of power per unit SOC.

As described above, upon transmission of the variety of determination information from the vehicle 10 to the central server 18, in Step S13, the control system 50 determines whether a charge permission signal transmitted from the central server 18 is received. If the control system 50 determines that the charge permission signal from the central server 18 is not received (NO in Step S13), that is, if a charge non-permission signal from the central server 18 is received, the process goes to Step S14 because the vehicle 10 is to be evacuated from the charging lane 12. In Step S14, the control system 50 determines whether the vehicle 10 is running on the charging lane 12. If the control system 50 determines that the vehicle 10 is running on the charging lane 12 (YES in Step S14), in Step S15, the inverter 43 and/or the steering motor 44 are controlled through the automatic driving control to perform lane change from the charging lane 12 to the adjacent driving lane 82. The vehicle control unit 49 controls the inverter 43 and/or the steering motor 44 to perform the lane change while monitoring the circumference of the vehicle 10 using the radar unit 73 and/or the camera unit 74 in Step S15. If the lane change from the charging lane 12 is completed in Step S15 or if the control system 50 determines in Step S14 that the vehicle 10 is not running on the charging lane 12 (NO in Step S14), the process goes back to Step S11. Then, the control system 50 performs the respective steps again.

If the control system 50 determines that the charge permission signal from the central server 18 is received (YES in Step S13), the process goes to Step S16 because the vehicle 10 is to be driven on the charging lane 12. In Step S16, the control system 50 determines whether the vehicle 10 is running on the charging lane 12. If the control system 50 determines that the vehicle 10 is not running on the charging lane 12 (NO in Step S16), in Step S17, the inverter 43 and/or the steering motor 44 are controlled through the automatic driving control to perform the lane change from the driving lane 82 to the adjacent charging lane 12. The vehicle control unit 49 controls the inverter 43 and/or the steering motor 44 to perform the lane change while monitoring the circumference of the vehicle 10 using the radar unit 73 and/or the camera unit 74 in Step S17. If the lane change from the charging lane 12 is completed in Step S17 or if the control system 50 determines in Step S16 that the vehicle 10 is running on the charging lane 12 (YES in Step S16), the process goes Step S18 in FIG. 8.

Referring to FIG. 8, in Step S18, the control system 50 controls the inverter 43 based on a target vehicle speed during the non-contact charge, which is transmitted from the central server 18, to adjust the vehicle speed of the vehicle 10 to the target vehicle speed. In Step S19, the control system 50 supplies the power from the power receiving coil 20 to the battery 41 via the in-vehicle charger 40 by controlling the in-vehicle charger 40 in accordance with the high-frequency power occurring at the power receiving coil 20 to perform the non-contact charge from the power transmitting coils 15 to the power receiving coil 20. After the non-contact charge, in Step S20, the control system 50 determines whether the running within the determination area A1a corresponding to the charge zone L1a where the vehicle 10 is being charged is continued. If the control system 50 determines that the vehicle 10 is not running within the determination area A1a (NO in Step S20), that is, if the control system 50 determines that the vehicle 10 has escaped from the determination area A1a corresponding to the charge zone L1a where the vehicle 10 is being charged, in Step S21, the control system 50 stops the in-vehicle charger 40 to stop the non-contact charge. Then, the process illustrated in FIG. 7 and FIG. 8 is terminated.

If the control system 50 determines that the vehicle 10 is running within the determination area A1a, that is, if the control system 50 determines that the running within the determination area A1a corresponding to the charge zone L1a where the vehicle 10 is being charged is continued (YES in Step S20), in Step S22, the control system 50 transmits the variety of determination information from the control system 50 in the vehicle 10 to the central server 18. In Step S23, the control system 50 determines whether the charge permission signal transmitted from the central server 18 is received. If the control system 50 determines that the charge permission signal from the central server 18 is not received (NO in Step S23), that is, if the charge non-permission signal from the central server 18 is received, in Step S24, the control system 50 stops the in-vehicle charger 40 to stop the non-contact charge. Then, the process goes to Step S14 in FIG. 7. Since the vehicle 10 is to be evacuated from the charging lane 12 in this case, the process goes from Step S14 to Step S15. In Step S15, the inverter 43 and/or the steering motor 44 are controlled through the automatic driving control to perform the lane change from the charging lane 12 to the adjacent driving lane 82. If the control system 50 determines that the charge permission signal from the central server 18 is received (YES in Step S23), the process goes back to Step S18. In Step S18, the control system 50 adjusts the vehicle speed of the vehicle 10 to the target vehicle speed. In Step S19, the control system 50 continues the non-contact charge from the power transmitting coils 15 to the power receiving coil 20.

[Upper-Limit Number Setting Control and Permitted Vehicle Selection Control]

Figure 9:
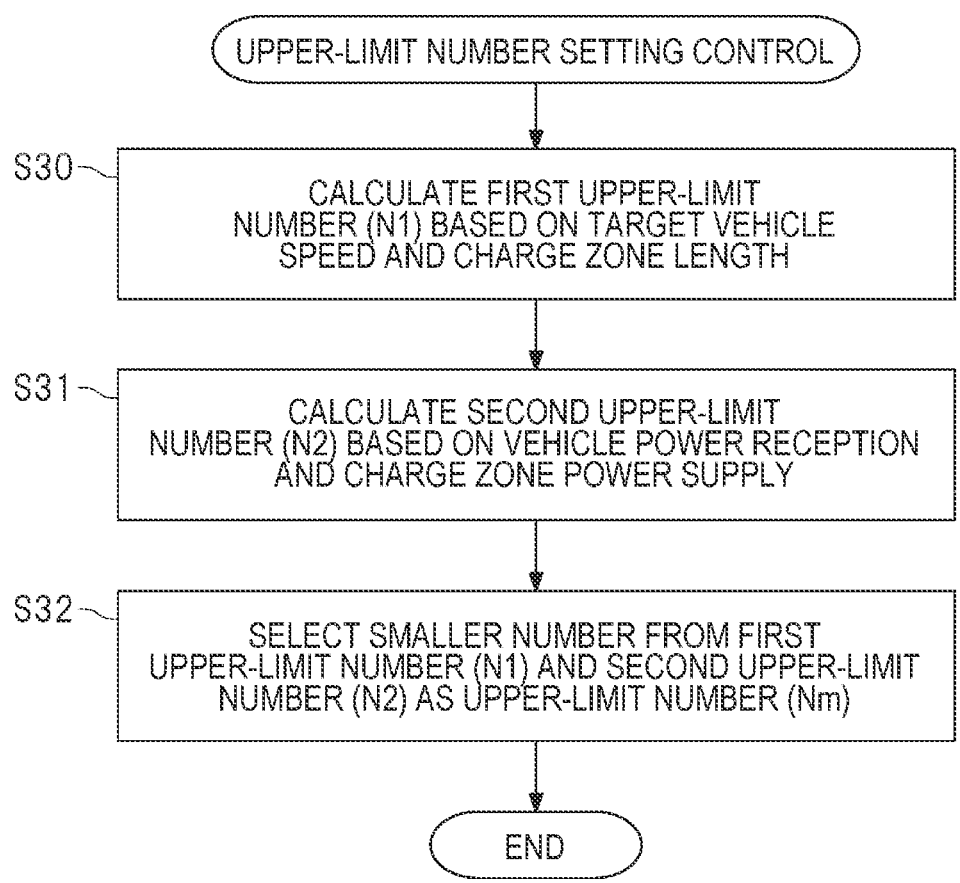
FIG. 9 is a flowchart illustrating an example of a process of upper-limit number setting control performed by the central server.
Figure 10:
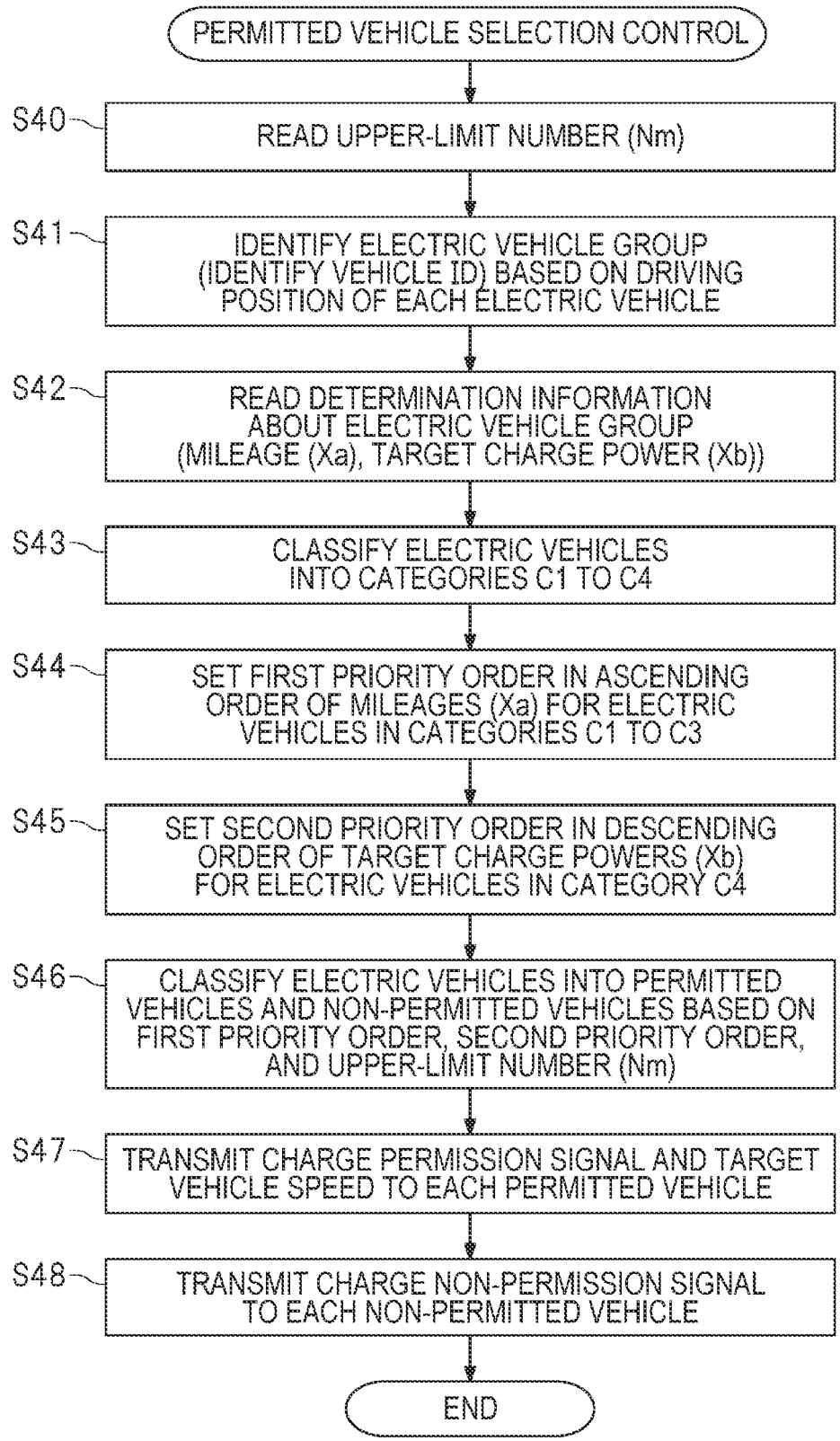
FIG. 10 is a flowchart illustrating an example of a process of permitted vehicle selection control performed by the central server.

Upper-limit number setting control and permitted vehicle selection control, which are performed by the central server 18, will now be described. FIG. 9 is a flowchart illustrating an example of a process of the upper-limit number setting control performed by the central server 18. FIG. 10 is a flowchart illustrating an example of a process of the permitted vehicle selection control performed by the central server 18. The respective steps illustrated in the flowcharts in FIG. 9 and FIG. 10 indicate the processes performed by the one or more processors 30 composing the central server 18. The upper-limit number setting control and the permitted vehicle selection control illustrated in FIG. 9 and FIG. 10 are performed every predetermined period by the central server 18 for each determination area corresponding to the charge zone. In other words, in the example illustrated in FIG. 6, the upper-limit number setting control and the permitted vehicle selection control are performed every predetermined period by the central server 18 for each of the determination areas A1a, A1b, and A1c corresponding to the charge zones L1a, L1b, and L1c, respectively. The processes of the upper-limit number setting control and the permitted vehicle selection control will be described, taking the determination area A1a corresponding to the charge zone L1a as an example.

<Upper-Limit Number Setting Control>

Referring to FIG. 9, in Step S30, the central server 18 calculates a first upper-limit number N1 chargeable within the charge zone L1a based on the target vehicle speed indicated from the central server 18 to each electric vehicle 10 and a charge zone length, which is the distance of the target charge zone L1a. In other words, the central server 18 sets the distance between the electric vehicles based on the target vehicle speed and divides the charge zone length by the distance between the electric vehicles to calculate the first upper-limit number N1 in the charge zone L1a. For example, when the target vehicle speed is set to a low value, the first upper-limit number N1 is calculated as a larger number because the distance between the electric vehicles 10 is capable of being set to a short distance. In contrast, when the target vehicle speed is set to a high value, the first upper-limit number N1 is calculated as a small number because the distance between the electric vehicles 10 is to be set to a long distance. In other words, the first upper-limit number N1 calculated by the central server 18 is increased with the decreasing target vehicle speed and is decreased with the increasing target vehicle speed. The target vehicle speed indicated from the central server 18 to each electric vehicle 10 is set in terms of the power transmission efficiency in the non-contact charge. In addition, since the safe distance between the electric vehicles is varied with the road surface condition, the target vehicle speed indicated from the central server 18 to each electric vehicle 10 may be set based on weather, which is a factor varying the road surface condition.

In Step S31, the central server 18 calculates a second upper-limit number N2 chargeable within the charge zone L1a based on vehicle power reception, which is power reception per vehicle, and charge zone power supply, which is power supply from the power system 13 to the charge zone L1a. In other words, the central server 18 calculates the second upper-limit number N2 within the charge zone L1a by dividing the charge zone power supply by the vehicle power reception. For example, when the charge zone power supply from the power system 13 is increased, the second upper-limit number N2 is calculated as a large number. In contrast, when the charge zone power supply from the power system 13 is decreased, the second upper-limit number N2 is calculated as a small number. In other words, the second upper-limit number N2 calculated by the central server 18 is increased as the power supply capacity of the charging facility 11 in the charge zone L1a is increased while the second upper-limit number N2 calculated by the central server 18 is decreased as the power supply capacity of the charging facility 11 in the charge zone L1a is decreased. The charge zone power supply supplied from the power system 13 to the charge zone L1a, that is, the power supply capacity of the charging facility 11 in the charge zone L1a is monitored by the power monitoring unit 29 in the power transmission control apparatus 16. In Step S32, the central server 18 compares the first upper-limit number N1 with the second upper-limit number N2 to select the smaller number as an upper-limit number Nm.

<Permitted Vehicle Selection Control>

Referring to FIG. 10, in Step S40, the central server 18 reads the upper-limit number Nm set in the upper-limit number setting control. In Step S41, the central server 18 identifies an electric vehicle group 90 composed of the multiple electric vehicles 10 running within the determination area A1a based on the driving position, which is transmitted from the electric vehicle 10 that has entered the determination area A1a. In other words, the central server 18 identifies the vehicle ID of each electric vehicle 10 running within the determination area A1a. In Step S42, the central server 18 reads the determination information (the mileage Xa and the target charge power Xb) about the identified electric vehicle group 90. In Step S43, the central server 18 classifies the respective electric vehicles 10 into categories "C1, C2, C3, and C4" based on the mileage Xa of each electric vehicle 10 composing the electric vehicle group 90. The category C1 is the category of vehicles that are not capable of reaching the next charge zone, and the category C2 is the category of vehicles that are capable of reaching the next charge zone but are not capable of reaching the next non-charge zone Sn. The category C3 is the category of vehicles that are capable of reaching the next non-charge zone Sn but are not capable reaching the next charging lane 12, and the category C4 is the category of vehicles that are capable of reaching the next charging lane 12.

In Step S44, the central server 18 sets a first priority order (the vehicle orders in a first vehicle group 91) in the ascending order of the mileages Xa for the first vehicle group 91 composed of the electric vehicles 10 classified into the categories "C1, C2, and C3" because the mileage Xa is shorter than a predetermined distance threshold value Da. In Step S45, the central server 18 sets a second priority order (the vehicle orders within a second vehicle group 92) in the descending order of the target charge powers Xb for the second vehicle group 92 composed of the electric vehicles 10 classified into the category "C4" because the mileage Xa is longer than the predetermined distance threshold value Da. The distance threshold value Da indicating the boundary between the category C3 and the category C4 is set to a distance value that is at least longer than the distance of the non-charge zone Sn.

In Step S46, the central server 18 classifies the respective electric vehicles 10 in the electric vehicle group 90 into permitted vehicles (charge permitted vehicles), which are the electric vehicles 10 for which the charge is permitted (the charge permitted targets), and non-permitted vehicles, which are the electric vehicles 10 for which the charge is not permitted, based on the first priority order, the second priority order, and the upper-limit number Nm. In other words, after the permitted vehicles of a number that does not exceed the upper-limit number Nm are selected from the first vehicle group 91 in accordance with the first priority order, the permitted vehicles are selected from the second vehicle group 92 in accordance with the second priority order. The electric vehicles 10 that are not selected as the permitted vehicles are classified into the non-permitted vehicles for which the non-contact charge is not permitted. After the permitted vehicles are selected from the electric vehicle group 90 in the determination area A1a, in Step S47, the central server 18 transmits the charge permission signal and the target vehicle speed to the electric vehicles 10 selected as the permitted vehicles. In Step S48, the central server 18 transmits the charge non-permission signal to the electric vehicles 10 classified into the non-permitted vehicles.

[Ordering of Electric Vehicles Through Permitted Vehicle Selection Control]

Figure 11:
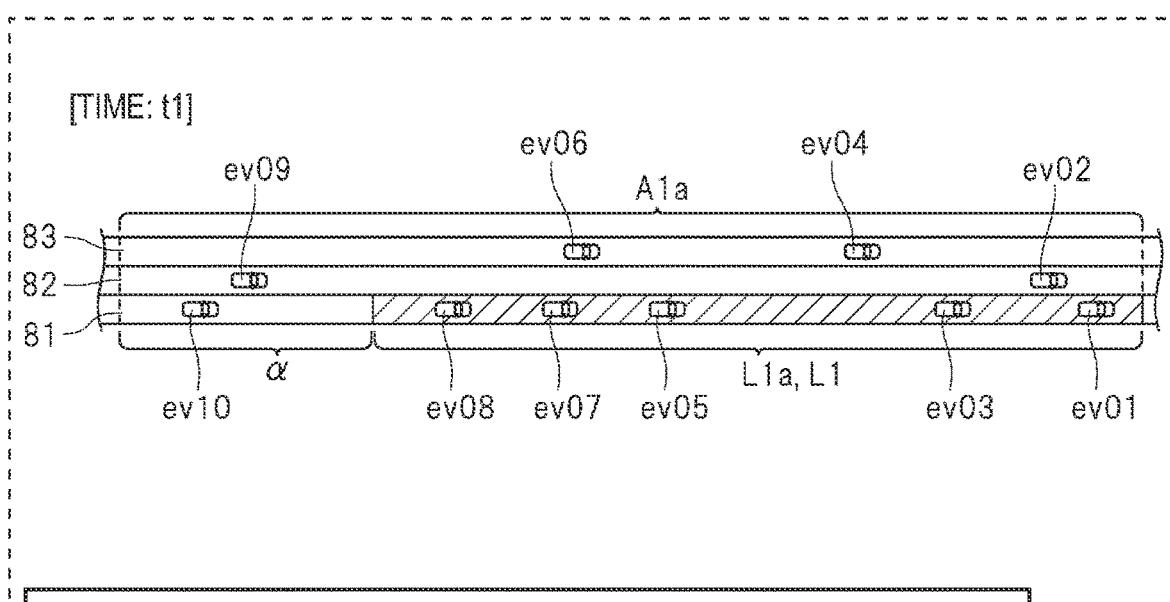
FIG. 11 illustrates an electric vehicle group and the ordering of the electric vehicles in the electric vehicle group in a determination area at a time t1.
Figure 12:
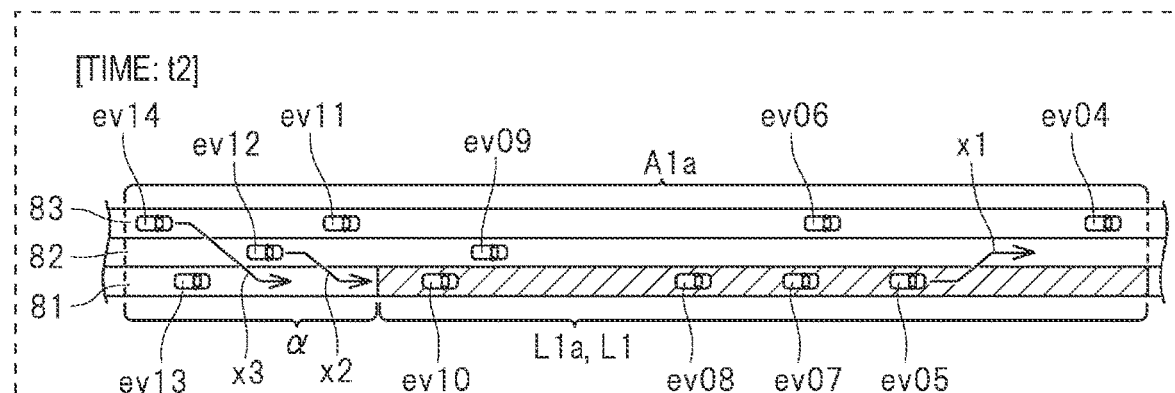
FIG. 12 illustrates the electric vehicle group and the ordering of the electric vehicles in the electric vehicle group in the determination area at a time t2.

FIG. 11 illustrates the electric vehicle group 90 and the ordering of the electric vehicles 10 in the electric vehicle group 90 in the determination area A1a at a time t1. FIG. 12 illustrates the electric vehicle group 90 and the ordering of the electric vehicles 10 in the electric vehicle group 90 in the determination area A1a at a time t2. In the examples illustrated in FIG. 11 and FIG. 12, the distance of each of the charge zones L1a, L1b, and L1c is set to "2 km" and the distance of the non-charge zone Sn is set to "30 km." In other words, the electric vehicle is classified into the category C1 when the mileage Xa is shorter than "2 km" and is classified into the category C2 when the mileage Xa is longer than or equal to "2 km" and is shorter than "6 km". The electric vehicle is classified into the category C3 when the mileage Xa is longer than or equal to "6 km" and is shorter than "36 km" and is classified into the category C4 when the mileage Xa is longer than or equal to "36 km."

In the examples illustrated in FIG. 11 and FIG. 12, the distance threshold value Da indicating the boundary between the category C3 and the category C4 is set to "36 km" at least longer than the distance of the non-charge zone Sn. In other words, for the electric vehicle 10 running within the charge zone L1a, the distance threshold value Da is set to a value at which the electric vehicle 10 is capable of reaching the next charging lane L2. Accordingly, in the examples illustrated in FIG. 11 and FIG. 12, the electric vehicles 10 are classified into the first vehicle group (the categories C1 to C3) 91 when the mileage Xa is shorter than "36 km" and are classified into the second vehicle group (the category C4) 92 when the mileage Xa is longer than "36 km." Since the respective electric vehicles 10 have different distances to the charging lane L2, the distance threshold value Da may be set for each electric vehicle 10 based on the driving position of each electric vehicle 10.

As illustrated in FIG. 11, at the time t1, the electric vehicle group 90 composed of electric vehicles ev01 to ev10 is running within the determination area A1a. In this case, the respective electric vehicles ev01 to ev10 are classified into the categories C1 to C4 based on the mileages Xa of the respective electric vehicles ev01 to ev10. The electric vehicles (ev08, ev10, ev07, ev01, and ev03) the mileages Xa of which are shorter than "36 km" are classified into the first vehicle group (the categories C1 to C3) 91 and are ordered in the ascending order of the mileages Xa (the vehicle orders 1 to 5). The electric vehicles (ev05, ev09, ev02, ev04, and ev06) the mileages Xa of which are longer than "36 km" are classified into the second vehicle group (the category C4) 92 and are ordered in the descending order of the target charge powers Xb (the vehicle orders 6 to 10).

Since the upper-limit number Nm of the permitted vehicles in the determination area A1a is set to "six", the five electric vehicles (ev08, ev10, ev07, ev01, and ev03) composing the first vehicle group 91 are selected as the permitted vehicles for which the non-contact charge is permitted. In this case, since the number of the electric vehicles in the first vehicle group 91 is smaller than the upper-limit number Nm, the electric vehicle ev05 having the highest target charge power Xb is selected from the five electric vehicles (ev05, ev09, ev02, ev04, and ev06) composing the second vehicle group 92 as the permitted vehicle for which the non-contact charge is permitted so as not to exceed the upper-limit number Nm of six. In other words, the permitted vehicles are selected from the electric vehicle group 90 based on the vehicle orders in the first vehicle group 91, the vehicle orders in the second vehicle group 92, and the upper-limit number Nm. In the selection of the permitted vehicles from the electric vehicle group 90, the first vehicle group 91 has priority over the second vehicle group 92. The non-contact charge is performed to the selected electric vehicles (ev08, ev10, ev07, ev01, ev03, and ev05).

Next, as illustrated in FIG. 12, at the time t2 after a predetermined time elapsed, the electric vehicles ev01 to ev03 depart from the determination area A1a and new electric vehicles ev11 to ev14 enter the determination area A1a. Accordingly, at the time t2, the electric vehicle group 90 composed of the electric vehicles ev04 to ev14 runs within the determination area A1a. In this case, the respective electric vehicle ev04 to ev14 are classified into the categories C1 to C4 based on the mileages Xa of the respective electric vehicles ev04 to ev14. The electric vehicles (ev08, ev10, ev07, ev12, ev13, and ev14) the mileages Xa of which are shorter than "36 km" are classified into the first vehicle group (the categories C1 to C3) 91 and are ordered in the ascending order of the mileages Xa (the vehicle orders 1 to 6). The electric vehicles (ev05, ev09, ev11, ev04, and ev06) the mileages Xa of which are longer than "36 km" are classified into the second vehicle group (the category C4) 92 and are ordered in the descending order of the target charge powers Xb (the vehicle orders 7 to 11).

Since the upper-limit number Nm of the permitted vehicles in the determination area A1a is set to "six", the six electric vehicles (ev08, ev10, ev07, ev12, ev13, and ev14) composing the first vehicle group 91 are selected as the permitted vehicles for which the non-contact charge is permitted. Since the number of the electric vehicles in the first vehicle group 91 reaches the upper-limit number Nm at the time t2, the permitted vehicle is not selected from the five electric vehicles (ev05, ev09, ev11, ev04, and ev06) composing the second vehicle group 92. Then, the charge permission signal to permit the non-contact charge is transmitted to the electric vehicles (ev08, ev10, ev07, ev12, ev13, and ev14) selected as the permitted vehicles, and the charge non-permission signal not to permit the non-contact charge is transmitted to the electric vehicles (ev05, ev09, ev11, ev04, and ev06), which are not selected as the permitted vehicles.

In the example illustrated in FIG. 12, since the electric vehicle ev05 is switched from the permitted vehicle to the non-permitted vehicle, the lane change of the electric vehicle ev05 through the automatic driving is performed so that the electric vehicle ev05 departs from the charging lane L1, as illustrated by an arrow x1. In addition, since the electric vehicle ev012 to 14 are switched from the non-permitted vehicles to the permitted vehicles, the lane change of the electric vehicles ev12 and ev14 through the automatic driving is performed so that the electric vehicles ev12 and ev14 enter the charging lane L1, as illustrated by arrows x2 and x3.

As described above, the central server 18 calculates the upper-limit number Nm of the electric vehicles 10 for which the charge is permitted based on the target vehicle speed. Then, the central server 18 orders the electric vehicles 10 in the electric vehicle group 90 in the ascending order of the mileages Xa and selects the electric vehicles 10 for which the charge is permitted from the electric vehicle group 90 based on the vehicle orders in the electric vehicle group 90 and the upper-limit number Nm. This enables the electric vehicles 10 to be subjected to the non-contact charge during running to be appropriately selected.

In addition, the central server 18 orders the electric vehicles 10 in the ascending order of the mileages Xa for the first vehicle group 91 the mileage Xa of which is shorter than the distance threshold value Da and orders the electric vehicles 10 in the descending order of the target charge powers Xb for the second vehicle group 92 the mileage Xa of which is longer than the distance threshold value Da. Then, the central server 18 selects the electric vehicles 10 for which the charge is permitted from the electric vehicle group 90 based on the vehicle orders in the first vehicle group 91, the vehicle orders in the second vehicle group 92, and the upper-limit number Nm. The central server 18 gives priority to the first vehicle group 91 over the second vehicle group 92 in the selection of the electric vehicles 10 for which the charge is permitted. This enables the electric vehicles 10 to be subjected to the non-contact charge during running to be more appropriately selected.

The disclosure is not limited the above embodiments and various modifications are available without departing from the spirit or scope of the disclosure. Although the steps in the upper-limit number setting control and the permitted vehicle selection control are performed using one central server 18 in the above description, the upper-limit number setting control and the permitted vehicle selection control are not limited to this and the steps in the upper-limit number setting control and the permitted vehicle selection control may be performed using multiple servers. Although the mileage Xa is calculated in each electric vehicle 10 in the above description, the calculation of the mileage Xa is not limited to this and, for example, the mileage Xa may be calculated in the central server 18. In this case, the last driving distance, information about the electricity consumption during the driving time, and the amount of accumulated power of the battery 41 are transmitted from each electric vehicle 10 to the central server 18 as the determination information.

Although the first upper-limit number N1 is compared with the second upper-limit number N2 to select the smaller number, among the first upper-limit number N1 and the second upper-limit number N2, as the upper-limit number Nm in the above description, the selection of the upper-limit number Nm is not limited to this and the upper-limit number Nm may be set using the first upper-limit number N1. In other words, the first upper-limit number N1 may be calculated based on the target vehicle speed and the calculated first upper-limit number N1 may be set as the upper-limit number Nm. Although the distance threshold value Da used for the classification of the electric vehicle group 90 into the first vehicle group 91 and the second vehicle group 92 is set to a distance value at least longer than the distance of the non-charge zone Sn in the above description, the setting of the distance threshold value Da is not limited to this. For example, the distance threshold value Da may be set to a value lower than or equal to the distance of the non-charge zone Sn.

Although the charging facility 11 illustrated in the drawings is the charging facility 11 based on magnetic-field resonance, the charging facility 11 is not limited to this. The charging facility in any mode may be adopted as long as the non-contact mode is adopted. For example, a charging facility based on electromagnetic induction may be adopted or a charging facility using microwaves may be adopted. Although the electric vehicle runs on the charging lane 12 through the automatic driving in the above description, the automatic driving may be cancelled to move the operation privilege from the control system 50 to the driver when the electric vehicle departs from the charging lane 12 for running. An electric automobile including no engine or a hybrid vehicle including the engine may be used as the electric vehicle 10.

The invention claimed is:

1. A management system used for a charging facility configured to perform non-contact charge to multiple electric vehicles running in a charge zone, the management system comprising:
a control apparatus comprising a processor and a memory that are communicably coupled to each other, and the control apparatus being configured to select one or more charge permitted vehicles for which charge is permitted, from an electric vehicle group including electric vehicles running in a determination area comprising at least part of the charge zone,
wherein the control apparatus is configured to
calculate an upper-limit number of the one or more charge permitted vehicles based on a target vehicle speed indicated to the one or more charge permitted vehicles,
order the electric vehicles in the electric vehicle group in an ascending order of mileages based on the mileage of each electric vehicle composing the electric vehicle group, and
select the one or more charge permitted vehicles from the electric vehicle group based on a result of ordering the electric vehicles in the electric vehicle group and the upper-limit number.

2. The management system according to claim 1,
wherein the upper-limit number is increased as the target vehicle speed decreases, and
wherein the upper-limit number is decreased as the target vehicle speed increases.

3. The management system according to claim 2,
wherein the control apparatus is configured to
calculate a first upper-limit number of the one or more charge permitted vehicles based on the target vehicle speed indicated to the one or more charge permitted vehicles,
calculate a second upper-limit number of the one or more charge permitted vehicles based on power supply capacity of the charging facility in the charge zone, and
select the first upper-limit number or the second upper-limit number, whichever is smaller, as the upper-limit number of the one or more charge permitted vehicles.

4. The management system according to claim 3,
wherein the control apparatus is configured to
classify the electric vehicles in the electric vehicle group into a first vehicle group a mileage of which is shorter than a distance threshold value and a second vehicle group a mileage of which is longer than the distance threshold value,
order the electric vehicles in the first vehicle group based on the mileage of each electric vehicle composing the first vehicle group,
order the electric vehicles in the second vehicle group based on target charge power of each electric vehicle composing the second vehicle group,
select the one or more charge permitted vehicles from the electric vehicle group based on a result of ordering the electric vehicles in the first vehicle group, a result of ordering the electric vehicles in the second vehicle group, and the upper-limit number, and give priority to the first vehicle group over the second vehicle group upon selecting the one or more charge permitted vehicle from the electric vehicle group.

5. The management system according to claim 4,
wherein the charge zone or multiple consecutive charge zones including the charge zone compose each of multiple charging lanes,
wherein the multiple charging lanes are set with a non-charge zone sandwiched therebetween, and
wherein the distance threshold value is a value of a distance longer than a distance of the non-charge zone.

6. The management system according to claim 2,
wherein the control apparatus is configured to
classify the electric vehicles in the electric vehicle group into a first vehicle group a mileage of which is shorter than a distance threshold value and a second vehicle group a mileage of which is longer than the distance threshold value,
order the electric vehicles in the first vehicle group based on the mileage of each electric vehicle composing the first vehicle group,
order the electric vehicles in the second vehicle group based on target charge power of each electric vehicle composing the second vehicle group,
select the one or more charge permitted vehicles from the electric vehicle group based on a result of ordering the electric vehicles in the first vehicle group, a result of ordering the electric vehicles in the second vehicle group, and the upper-limit number, and
give priority to the first vehicle group over the second vehicle group upon selecting the one or more charge permitted vehicle from the electric vehicle group.

7. The management system according to claim 6,
wherein the charge zone or multiple consecutive charge zones including the charge zone compose each of multiple charging lanes,
wherein the multiple charging lanes are set with a non-charge zone sandwiched therebetween, and
wherein the distance threshold value is a value of a distance longer than a distance of the non-charge zone.

8. The management system according to claim 1,
wherein the control apparatus is configured to
calculate a first upper-limit number of the one or more charge permitted vehicles based on the target vehicle speed indicated to the one or more charge permitted vehicles,
calculate a second upper-limit number of the one or more charge permitted vehicles based on power supply capacity of the charging facility in the charge zone, and
select the first upper-limit number or the second upper-limit number, whichever is smaller, as the upper-limit number of the one or more charge permitted vehicles.

9. The management system according to claim 8,
wherein the control apparatus is configured to
classify the electric vehicles in the electric vehicle group into a first vehicle group a mileage of which is shorter than a distance threshold value and a second vehicle group a mileage of which is longer than the distance threshold value,
order the electric vehicles in the first vehicle group based on the mileage of each electric vehicle composing the first vehicle group,
order the electric vehicles in the second vehicle group based on target charge power of each electric vehicle composing the second vehicle group,
select the one or more charge permitted vehicles from the electric vehicle group based on a result of ordering the electric vehicles in the first vehicle group, a result of ordering the electric vehicles in the second vehicle group, and the upper-limit number, and
give priority to the first vehicle group over the second vehicle group upon selecting the one or more charge permitted vehicle from the electric vehicle group.

10. The management system according to claim 9,
wherein the charge zone or multiple consecutive charge zones including the charge zone compose each of multiple charging lanes,
wherein the multiple charging lanes are set with a non-charge zone sandwiched therebetween, and
wherein the distance threshold value is a value of a distance longer than a distance of the non-charge zone.

11. The management system according to claim 1,
wherein the control apparatus is configured to
classify the electric vehicles in the electric vehicle group into a first vehicle group a mileage of which is shorter than a distance threshold value and a second vehicle group a mileage of which is longer than the distance threshold value,
order the electric vehicles in the first vehicle group based on the mileage of each electric vehicle composing the first vehicle group,
order the electric vehicles in the second vehicle group based on target charge power of each electric vehicle composing the second vehicle group,
select the one or more charge permitted vehicles from the electric vehicle group based on a result of ordering the electric vehicles in the first vehicle group, a result of ordering the electric vehicles in the second vehicle group, and the upper-limit number, and
give priority to the first vehicle group over the second vehicle group upon selecting the one or more charge permitted vehicle from the electric vehicle group.

12. The management system according to claim 11,
wherein the charge zone or multiple consecutive charge zones including the charge zone compose each of multiple charging lanes,
wherein the multiple charging lanes are set with a non-charge zone sandwiched therebetween, and
wherein the distance threshold value is a value of a distance longer than a distance of the non-charge zone.

* * * * *